(12) United States Patent
Cui

(10) Patent No.: US 11,195,297 B2
(45) Date of Patent: Dec. 7, 2021

(54) METHOD AND SYSTEM FOR VISUAL LOCALIZATION BASED ON DUAL DOME CAMERAS

(71) Applicants: CHINA-GERMANY(ZHUHAI) ARTIFICIAL INTELLIGENCE INSTITUTE CO., LTD, Guangdong (CN); ZHUHAI 4DAGE TECHNOLOGY CO., LTD, Guangdong (CN)

(72) Inventor: Yan Cui, Guangdong (CN)

(73) Assignees: CHINA-GERMANY(ZHUHAI) ARTIFICIAL INTELLIGENCE INSTITUTE CO., LTD, Zhuhai (CN); ZHUHAI 4DAGE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 16/882,333

(22) Filed: May 22, 2020

(65) Prior Publication Data

US 2021/0065398 A1    Mar. 4, 2021

(30) Foreign Application Priority Data

Aug. 29, 2019 (CN) .......................... 201910807342.7

(51) Int. Cl.
*G06T 7/73* (2017.01)
*G06T 7/292* (2017.01)
*G06T 7/246* (2017.01)

(52) U.S. Cl.
CPC ................ *G06T 7/73* (2017.01); *G06T 7/246* (2017.01); *G06T 7/292* (2017.01); *G06T 2207/10012* (2013.01); *G06T 2207/30252* (2013.01)

(58) Field of Classification Search
CPC ........... G06T 7/20; G06T 7/246; G06T 7/285; G06T 7/292; G06T 7/33; G06T 7/50;
(Continued)

(56) References Cited

U.S. PATENT DOCUMENTS

| | | | |
|---|---|---|---|
| 10,282,852 B1 * | 5/2019 | Buibas et al. | G06T 7/277 |
| 2010/0040279 A1 * | 2/2010 | Yoon et al. | G05D 1/0251 |
| | | | 382/153 |
| 2020/0011668 A1 * | 1/2020 | Derhy et al. | G01C 21/206 |

FOREIGN PATENT DOCUMENTS

| | | | |
|---|---|---|---|
| CN | 105674993 A | 6/2016 | |
| CN | 107341764 A | 11/2017 | |

(Continued)

*Primary Examiner* — Andrew W Johns

(57) ABSTRACT

A method and a system for visual localization based on dual dome cameras is based on two synchronized panoramic video streams output by dual dome cameras to solve the problem of fewer feature points and tracking failure, thereby achieving stable visual SLAM tracking. The depth information of the scene is restored via the two panoramic video streams based on the principle of triangulation measurement. The positions and postures of the dual dome cameras are calculated based on a principle of binocular vision based SLAM, so that accurate map information are obtained finally by evaluating the positions and postures of the dual dome cameras corresponding to the key frames and the depth information in the key frames. The disclosure makes up for inaccurate and incomplete depth information of the scenes in passive scene recoveries, which is suitable for vehicle and robot positioning, obstacle detection and free space estimation.

9 Claims, 2 Drawing Sheets

(58) Field of Classification Search
CPC .. G06T 7/55; G06T 7/593; G06T 7/70; G06T 7/73; G06T 7/80; G06T 7/85; G06T 7/97; G06T 2207/30244; G06T 2207/30252; G01C 21/005; G01C 21/38; G01C 21/3804; G05D 1/0231; G05D 1/0246; G05D 1/0251; H04N 2013/0081; H04N 13/239
See application file for complete search history.

(56) References Cited

FOREIGN PATENT DOCUMENTS

| | | |
|---|---|---|
| CN | 110148216 A | 8/2019 |
| TW | 200528945 A | 9/2005 |

* cited by examiner

METHOD AND SYSTEM FOR VISUAL LOCALIZATION BASED ON DUAL DOME CAMERAS

CROSS-REFERENCE TO RELATED APPLICATIONS

This application claims the benefit of priority from Chinese Patent Application No. 201910807342.7, filed on Aug. 29, 2019. The content of the aforementioned application, including any intervening amendments thereto, is incorporated herein by reference in its entirety.

TECHNICAL FIELD

The present application relates to visual processing technologies, and more particularly to a method and system for visual localization based on dual dome cameras.

BACKGROUND

At present, the existing Monocular Vision Simultaneous Localization and Mapping (referred to as MonoVSLAM hereafter) system is a mature technology, but it cannot directly obtain depth information of the scenes via images. Since the MonoVSLAM system cannot perform a triangulation measurement in the first frame, it often requires multiple perspectives or filtering techniques to generate an initialized map during the start-up. Moreover, the MonoVSLAM system may cause scale drift, and performing pure rotation in an exploration process may cause the failure of initialization for the MonoVSLAM system, so it is difficult to achieve accurate motion estimation and accurate restoration of scenes depth information. By comparison, a binocular vision based SLAM (referred to as bino VSLAM hereafter) system is a good choice. However, some existing bino VSLAM systems are based on two synchronized ordinary cameras or fisheye cameras. The ordinary cameras have a small angle of view, so that it cannot extract adequate scenes feature points; on the other hand, there is a large distortion in the images output by the fisheye cameras, so that the distortion correction is required to extract the feature points. During the correcting, some feature points will be lost, thereby affecting the feature tracking.

SUMMARY

In the prior art, there is a low positioning accuracy for the map points, so that the feature tracking is affected. In view of this, the present disclosure provides a method and a system for visual localization based on dual dome cameras.

The first technical solution is as follows:

a method for visual localization based on dual dome cameras, comprising:

(1) calibrating the dual dome cameras and obtaining internal and external parameters thereof, wherein the dual dome cameras comprise an upper dome camera and a lower dome camera;

(2) collecting video stream data via the dual dome cameras;

(3) carrying out tracking for feature points based on the collected video stream data;

(4) restoring depth information of scenes based on a principle of triangulation measurement;

(5) calculating positions and postures of the dual dome cameras based on a principle of bino VSLAM; and (6) obtaining accurate map information of the scenes by evaluating the positions and postures of the dual dome cameras corresponding to key frames and the depth information in the key frames.

Optionally, in the step (1), the internal and external parameters comprise an internal parameter matrix and an external parameter matrix of the dual dome cameras. Based on the internal and external parameter matrices, a conversion of a world coordinate system to a dome camera coordinate system and a mapping relationship between the dome camera coordinate system and an image coordinate system are obtained. Conversely, coordinates of object points in the world coordinate system are calculated from image points in an image. Since the dual dome cameras are placed at any position in the environment, a datum coordinate system is selected in the scenes to describe a position of the dual dome cameras, and then used to describe a position of any object in the scenes. The datum coordinate system is called the world coordinate system. The relationship between the camera coordinate system and the world coordinate system can be described by rotating matrices and translating vectors.

Optionally, the step (3) comprises:

calculating the feature points and descriptors of the upper and lower dome cameras;

determining feature points that are continuously tracked in k frames as stable feature points; and determining the tracking as stable tracking when the stable feature points in a current frame exceed a threshold.

Optionally, the step (4) comprises:

restoring a parallax map in the scenes; and restoring depth information of the scenes based on the parallax map and the principle of triangulation measurement.

Optionally, the step (6) comprises:

creating the key frames and initializing the positions and postures of the dual dome cameras corresponding to the key frames to create an initial map from all three-dimensional points;

optimizing the tracking and performing loop closure detection and making the global majorization based on Bundle adjustment (BA); and inserting the key frames during the tracking to get accurate map information of the scenes.

Optionally, the step of optimizing the tracking and performing the loop closure detection and making the global majorization based on BA comprises:

when detecting loopback information, observing the depth information and scale information obtained from the dual dome cameras according to a loopback correction and an optimized posture picture of the loopback information; and based on the loopback information, triggering the global BA again to optimize the current map until accurate map information of the scene is obtained.

The second technical solution is as follows:

a system for visual localization based on dual dome cameras, comprising:

a data collection module, configured to calibrate the dual dome cameras, obtain the internal and external parameters of the upper and lower dome cameras, while collect the video stream data via the dual dome cameras;

a data transmission module, configured to build a network environment, and transmit the collected video stream data from the dual dome cameras to a Personal Computer (PC) terminal in real time;

an image processing module, configured to track the feature points based on the collected video stream data, and restore the depth information of the scenes based on the principle of triangulation measurement; and a positioning and map feature constructing module, configured to calculate the positions and postures of the dual dome cameras based on a principle of bino VSLAM, and obtain accurate map information of the scenes by evaluating the positions and postures of the dual dome cameras corresponding to key frames and the depth information in the key frames.

Optionally, the mobile terminal in the data transmission module is configured to calculate the positions and postures of the dual dome cameras in real time in actual scenes.

Optionally, the image processing module is configured to calculate the feature points and the descriptors of the upper and lower dome cameras; besides, after the stable tracking is determined, the image processing module is configured to restore the parallax map in the scenes, and finally restore the depth information of the scenes.

Compared to methods and shooting devices in the prior art, the technical solutions of the present disclosure adopts dual dome cameras for data collection, thereby reducing an amount of data collection and calculation cost. Moreover, the disclosure can directly obtain depth information of the environment via images, thereby accurately realizing a motion estimation, which is applicable to a visual localization in larger scenes.

DETAILED DESCRIPTION OF EMBODIMENTS

Technical solutions of the present disclosure will be described in detail below with reference to the drawings and the specific embodiments. It should be understood that the embodiments and specific technical features in the embodiments are only intended to illustrate the technical solutions of the present disclosure, but not to limit the present disclosure. Without conflict, the embodiments and the specific technical features in the embodiments can be combined with each other.

Figure 1:
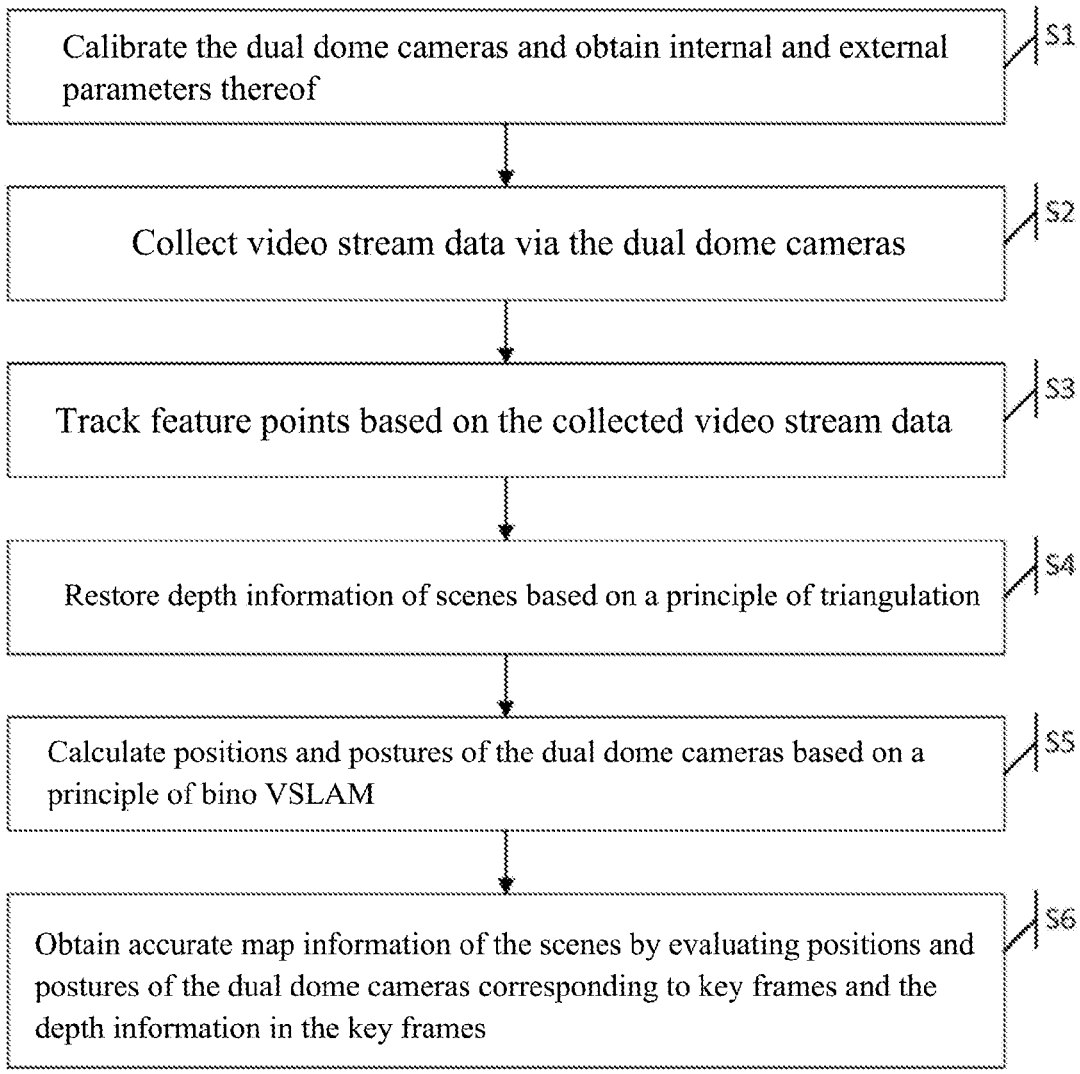
FIG. 1 is a flowchart of a method for visual localization based on dual dome cameras according to an embodiment of the present disclosure.

As shown in FIG. 1, a method for visual localization based on dual dome cameras according to an embodiment of the present disclosure includes the following steps:

S1 dual dome cameras are calibrated, and internal and external parameters thereof are obtained, where the dual dome cameras include an upper dome camera and a lower dome camera;

S2 video stream data is collected via the dual dome cameras;

S3 feature points are tracked based on the collected video stream data;

in this step, firstly, the feature points and descriptors of the upper and lower dome cameras are calculated; the feature points are tracked and the feature points that continuously tracked in five frames are defined as stable feature points; and a current frame with more than 10 stable feature points are defined as stable tracking;

S4 depth information of a scene is restored based on a principle of triangulation measurement;

in this step, firstly, a parallax map is restored, and the depth information the scene is restored based on the parallax map and the principle of triangulation measurement;

S5 positions and postures of the dual dome cameras are calculated based on a principle of bino VSLAM; and S6 accurate map information of the scene is obtained by evaluating the positions and postures of the dual dome cameras corresponding to key frames and the depth information in the key frames.

Specifically, the step (6) comprises the following steps.

a) Map Initialization

Since the dual dome cameras can directly obtain the depth information, a key frame (i.e., the first frame) can be established when the system is initialized; the positions and postures of the dual dome cameras are initialized; and an initialization map is created from all three-dimensional points.

b) Tracking and Optimization

The system adopts bundle adjustment (BA) to optimize the positions and postures of the dual dome cameras during tracking (pure movement BA), optimize the key frames of a local window and the feature points of a local map (local BA), and optimize all the key frames and the feature points (global BA) after loopback detection.

c) Loop Closure Detection and Global BA

There are two steps in the loop closure detection: firstly, loopback information is detected; secondly, the loopback information is used to correct and optimize the images of the positions and postures of the dual dome cameras. For the dual dome cameras, the depth information will make the scale information observable; in addition, and the geometry check and the optimization of the images of the positions and postures will no longer need to deal with scale drift; and the loop closure detection is based on rigid transformation instead of similarity transformation.

When loopback information is detected, global BA optimization and the current map synthesis will be triggered again. If a new loop is detected while the optimization is running, the optimization is aborted and the loop is closed, which will start a full BA optimization again. When the full BA optimization has ended, subsets of updated key frames and points optimized by the full BA are respectively merged with the key frames which are not updated and the points inserted during the running of optimization. Finally, the key frames which are not updated are updated by the corrections for key frames (e.g., the system which is not optimized is transformed into an optimized system) through a spanning tree. The feature points which are not updated are modified according to corrected reference frames.

d) Key Frame Insertion

The key frames are accurately inserted and redundancies of the previous frame are removed, which is crucial in large scenes.

The embodiment provides a method for visual localization based on dual dome cameras. Based on the synchronized panoramic video stream output by the upper and lower dome cameras, the problem of fewer feature points and tracking failure can be solved, thereby achieving stable visual SLAM tracking. Based on two panoramic video streams from the upper and lower dome cameras, the depth information of the scene is restored through a principle of triangulation measurement. In addition, based on a principle of bino VSLAM, the positions and postures of the dual dome cameras are calculated, and the accurate scenes map information are obtained finally by evaluating the positions and postures of the dual dome cameras corresponding to key frames and the depth information in the key frames. The solution makes up for inaccurate and incomplete depth information of the scene in passive scene recoveries, which is suitable for vehicle and robot positioning, obstacle detection and free space estimation.

Figure 2:
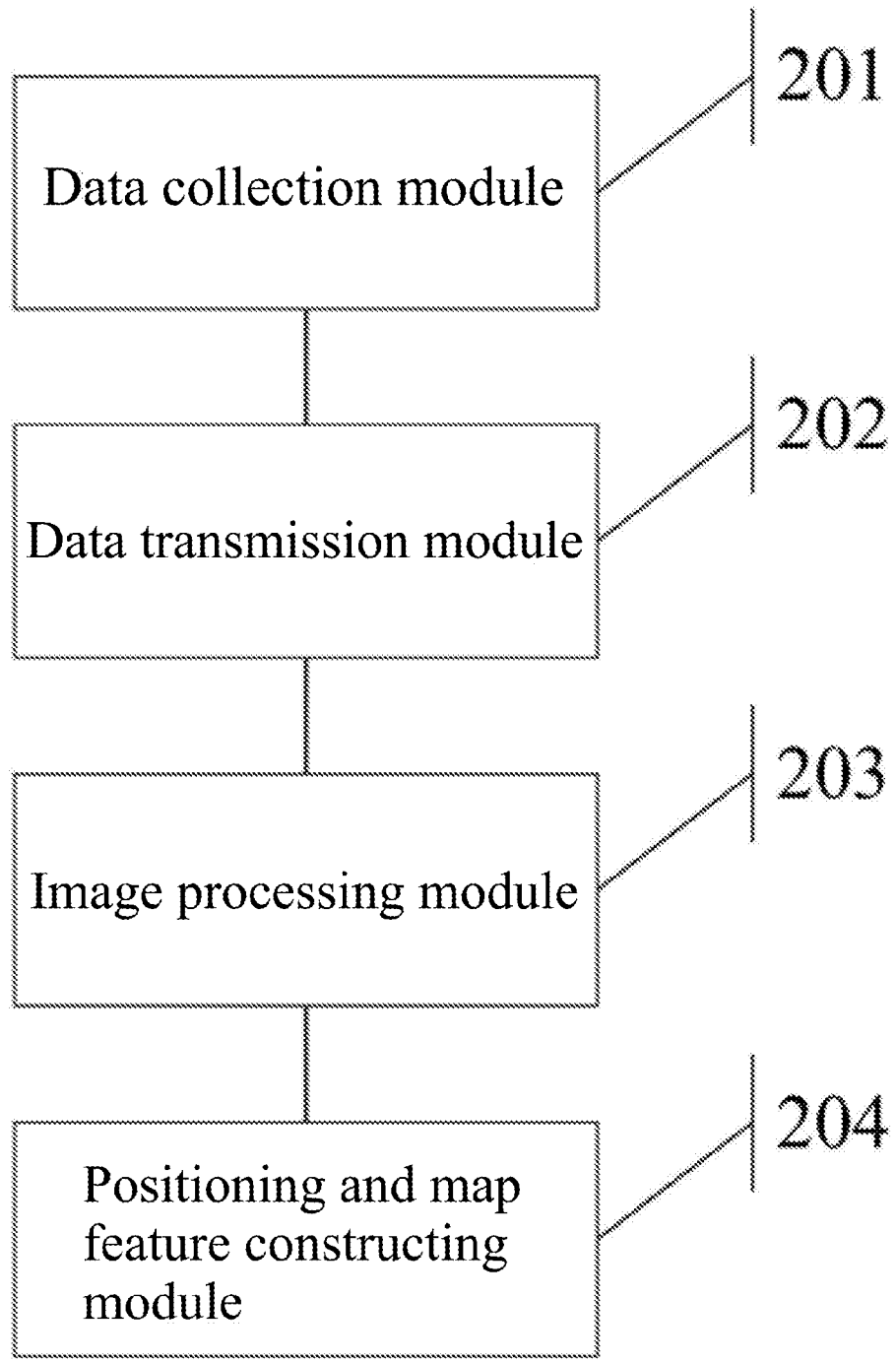
FIG. 2 schematically shows a system for visual localization based on the dual dome cameras according to an embodiment of the present disclosure.

Based on the method, the present disclosure further provides a system for visual localization based on dual dome cameras. As shown in FIG. 2, a system for visual localization based on dual dome cameras according to an embodiment of the present disclosure includes:

a data collection module 201, configured to calibrate the dual dome cameras, obtain the internal and external parameters of the upper and lower dome cameras, while collect the video stream data via the dual dome cameras;

a data transmission module 202, configured to build a network environment, and connect the dual dome cameras with a mobile terminal, so that the mobile terminal directly obtains video streams from the dual dome cameras; the dual dome cameras are provided with a chip to perform a video stitching process and transmit the stitched video stream back to the mobile terminal in real time;

an image processing module 203, configured to track the feature points based on the collected video stream data, and restore depth information of the scene based on the principle of triangulation measurement; and a positioning and map feature constructing module 204, configured to calculate the positions and postures of the dual dome cameras based on a principle of bino VSLAM, and obtain accurate map information of the scene by evaluating the positions and postures of the dual dome cameras corresponding to key frames and the depth information in the key frames.

Further, in the embodiment of the present disclosure, the mobile terminal of the data transmission module 202 is configured to calculate the positions and postures of the dual dome cameras in real time in actual scenes.

Further, in the embodiment of the present disclosure, the image processing module 203 is configured to calculate the feature points and the descriptors of the upper and lower dome cameras; after the tracking is determined as the stable tracking, the image processing module restores the parallax map in the scene, and finally restores the depth information of the scene.

Although the preferred embodiments of the present disclosure have been described, changes and modifications can be made by those of ordinary skill in the art based on these embodiments once they learn the basic inventive concept. Therefore, the appended claims are intended to be interpreted as including the preferred embodiments and all changes and modifications that fall within the scope of the present application, which includes the use of specific symbols or marks, and other changes.

Obviously, those of ordinary skill in the art can make various modifications and variations to the present application without departing from the spirit and scope of the application. Therefore, modifications and variations which fall within the scope of the appended claims of this application and the equivalents thereof shall fall within the scope of the present application.

What is claimed is:

1. A method for visual localization based on dual dome cameras, comprising:
   (1) calibrating the dual dome cameras and obtaining internal and external parameters thereof, wherein the dual dome cameras comprise an upper dome camera and a lower dome camera;
   (2) collecting video stream data via the dual dome cameras;
   (3) carry out tracking for feature points based on the collected video stream data;
   (4) restoring depth information of scenes based on a principle of triangulation measurement;
   (5) calculating positions and postures of the dual dome cameras based on a principle of bino VSLAM; and
   (6) obtaining accurate map information of the scenes by evaluating the positions and postures of the dual dome cameras corresponding to key frames and the depth information in the key frames.

2. The method of claim 1, wherein in the step (1), the internal and external parameters comprise an internal parameter matrix and an external parameter matrix of the dual dome cameras; based on the internal parameter matrix and the external parameter matrix, a conversion of a world coordinate system to a dome camera coordinate system and a mapping relationship between the dome camera coordinate system and an image coordinate system are obtained.

3. The method of claim 1, wherein the step (3) comprises:
   calculating the feature points and descriptors of the upper and lower dome cameras;
   determining feature points that are continuously tracked in k frames as stable feature points; and
   determining the tracking as stable tracking when the stable feature points in a current frame exceed a threshold.

4. The method of claim 1, wherein the step (4) comprises:
   restoring a parallax map in the scenes; and
   restoring depth information of the scenes based on the parallax map and the principle of triangulation measurement.

5. The method of claim 1, wherein the step (6) comprises:
   creating the key frames and initializing the positions and postures of the dual dome cameras corresponding to the key frames to create an initial map from all three-dimensional points;
   optimizing the tracking and performing a loop closure detection and making global majorization based on Bundle Adjustment (BA); and
   inserting the key frames during the tracking to get accurate map information of the scenes.

6. The method of claim 5, wherein the step of optimizing the tracking and performing the loop closure detection and making the global majorization based on the BA comprises:
   when detecting loopback information, observing the depth information and scale information obtained from the dual dome according to a loopback correction and an optimized posture picture of the loopback information; and
   based on the loopback information, triggering the global majorization based on BA again to optimize the current map until accurate map information of the scene is obtained.

7. A system for visual localization based on dual dome cameras, comprising:
   a data collector, configured to calibrate the dual dome cameras, obtain internal and external parameters of the dual dome cameras, while collect video stream data via the dual dome cameras, wherein the dual dome cameras comprise an upper dome camera and a lower dome camera;
   a data transmitter, configured to build a network environment, and connect the dual dome cameras with a mobile terminal, so that the mobile terminal directly obtains video streams from the dual dome cameras; the dual dome cameras are provided with a chip to perform a video stitching process and transmit the stitched video stream back to the mobile terminal in real time;

an image processor, configured to track feature points based on the video stream data, and restore depth information of a scene based on a principle of triangulation measurement; and a positioning and map feature constructor, configured to calculate positions and postures of the dual dome cameras based on a principle of bino VSLAM, and obtain accurate map information of the scene by evaluating the positions and postures of the dual dome cameras corresponding to key frames and depth information in the key frames.

8. The system of claim 7, wherein the mobile terminal in the data transmitter is configured to calculate the positions and postures of the dual dome cameras in real time in actual scenes.

9. The system of claim 7, wherein the image processor is configured to calculate the feature points and descriptors of the upper and lower dome cameras; after determining a tracking process as stable tracking, the image processor restores a parallax map in the scene, and finally restores the depth information of the scene.

\* \* \* \* \*